(12) United States Patent
Baumann et al.

(10) Patent No.: US 7,311,180 B2
(45) Date of Patent: Dec. 25, 2007

(54) DISK BRAKE

(75) Inventors: Dietmar Baumann, Hemmingen (DE); Hanniel Schmidt, Karlsbad (DE); Herbert Vollert, Vaihingen/Enz (DE); Frieder Keller, Ubstadt-Weiher (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/466,509

(22) PCT Filed: Sep. 19, 2001

(86) PCT No.: PCT/DE01/03597

§ 371 (c)(1),
(2), (4) Date: Jul. 16, 2004

(87) PCT Pub. No.: WO02/25137

PCT Pub. Date: Mar. 28, 2002

(65) Prior Publication Data

US 2004/0245056 A1    Dec. 9, 2004

(30) Foreign Application Priority Data

Sep. 19, 2000 (DE) ................................. 100 46 177

(51) Int. Cl.
*F16D 55/14* (2006.01)

(52) U.S. Cl. ..................... 188/72.2; 188/72.7; 188/162

(58) Field of Classification Search .............. 188/72.2, 188/72.6, 72.7, 72.8, 73.1, 162 X, 73.41 X
See application file for complete search history.

(56) References Cited

U.S. PATENT DOCUMENTS

| | | | | | |
|---|---|---|---|---|---|
| 1,920,078 | A | * | 7/1933 | Hargreaves | ................. 188/136 |
| 2,945,677 | A | * | 7/1960 | Kammerer, Jr. | ............... 60/431 |
| 3,921,764 | A | * | 11/1975 | Mathauser | ............... 188/24.14 |
| 4,161,238 | A | * | 7/1979 | Lasoen et al. | ............. 188/72.2 |
| 4,375,250 | A | * | 3/1983 | Burgdorf | ................... 188/72.2 |
| 4,852,699 | A | * | 8/1989 | Karnopp et al. | ........... 188/72.2 |
| 5,829,557 | A | | 11/1998 | Halasy-Wimmer et al. | |

FOREIGN PATENT DOCUMENTS

| | | |
|---|---|---|
| GB | 2 291 150 A | 1/1996 |
| JP | 10-331884 | 12/1998 |
| WO | WO 96/03301 A1 | 2/1996 |

* cited by examiner

*Primary Examiner*—Melody M. Burch
(74) *Attorney, Agent, or Firm*—Ronald E. Greigg

(57) ABSTRACT

An electromechanically actuatable self-boosting disk brake in which a friction brake lining is guided displaceably with a guide whose angle to the brake disk is adjustable via an electric motor to attain brake reinforcement. The angle of the guide is adjusted independently of an actuating device with which the friction brake lining is pressed against the brake disk.

4 Claims, 2 Drawing Sheets

DISK BRAKE

CROSS-REFERENCE TO RELATED APPLICATIONS

This application is a 35 USC 371 application of PCT/DE 01/03597 filed on Sep. 19, 2001.

BACKGROUND OF THE INVENTION

1. Field of the Invention

The invention relates to a disk brake having a brake disk. a friction brake lining and an actuating device for pressing the lining against the disc.

2. Description of the Prior Art

Disk brakes, are known per se, have both a brake disk and typically two friction brake linings disposed one on each side of the brake disk. The friction brake linings are received in a brake caliper. Most disk brakes used today are actuated hydraulically; that is, for generating a braking moment, the friction brake linings are pressed hydraulically against the brake disk. It is possible for each friction brake lining to be pressed by a hydraulic piston assigned to it against the brake disk. It is equally possible for one of the friction brake linings to be pressed hydraulically against the brake disk and for the other friction brake lining, by a reaction force transmitted via the brake caliper, to be pressed against the other side of the brake disk. In that case, the brake caliper is embodied as a floating caliper that is displaceable transversely to the brake disk.

It has also been proposed that disk brakes be actuated electromechanically. In this connection, see International Patent Disclosure WO 96/03301, for example. The actuating force for pressing the one friction brake lining against the brake disk is exerted against the friction brake lining in this case by an electric motor via a rotation/translation conversion gear, such as a spindle drive. However, electromechanical disk brakes have the disadvantage that to generate a sufficiently high tightening force (this is the force with which the friction brake lining is pressed against the brake disk) and for fast tightening and release, that is, to attain sufficiently high dynamics, a large and consequently heavy electric motor is needed. This is undesired, since the disk brake can be only poorly accommodated in the interior of a vehicle wheel rim, where it is usually placed. Moreover, the disk brake is typically mounted on a wheel carrier and forms an unsprung mass. A high weight of the unsprung mass adversely affects a vehicle's road holding ability and is therefore unwanted. Another disadvantage of known electromechanical disk brakes is their high power consumption, which puts a considerable burden on an on-board electrical system of a motor vehicle.

SUMMARY OF THE INVENTION

The disk brake of the invention has a guide for the friction brake lining whose angle to the brake disk is adjustable. Accordingly, a displacement direction of the friction brake lining is adjustable in its angle to the brake disk as the friction brake lining is pressed against the brake disk. If the friction brake lining is pressed against the rotating brake disk for the sake of braking, the brake disk exerts a frictional force on the friction brake lining, which is oriented parallel to the brake disk, in its circumferential or secant direction, and in the direction of rotation of the brake disk. If the guide of the friction brake lining is adjusted in an angle other than a right angle that is oblique to the brake disk, then the frictional force exerted by the brake disk on the friction brake lining causes a force component in the longitudinal direction of the guide. This force component acting on the friction brake lining presses the friction brake lining against the brake disk in addition to the tightening force exerted by the actuating device and thus increases the braking moment of the disk brake of the invention. The magnitude of the additional pressure force exerted on the friction brake lining by the rotating brake disk, as a consequence of the frictional force between the brake disk and the friction brake lining pressed against it via the guide that is adjustable in its angle to the brake disk, is dependent on the angle at which the guide is located relative to the brake disk. The additional pressure force causes a brake reinforcement or self-boosting of the disk brake of the invention; only some of the tightening force of the friction brake lining against the brake disk is brought to bear by the actuating device. The magnitude of the brake reinforcement or self-boosting is adjustable by adjusting the angle of the guide of the friction brake lining relative to the brake disk.

The brake reinforcement of the disk brake of the invention has the advantage that only slight actuating energy suffices to actuate it. Other advantages are high dynamics upon tightening and release. There is also the advantage that the magnitude of the brake reinforcement is adjustable by adjusting the guide of the friction brake lining and can also be varied during the actuation of the disk brake.

According to one feature, the guide for the friction brake lining is embodied as a linear guide, which guides the friction brake lining displaceably in the direction of the brake disk. This kind of linear guide can for instance be a rod guide or sliding block guide. The linear guide can but need not necessarily be a rectilinear guide.

According to another feature, the guide is embodied such that the friction brake lining pressed against the brake disk urges the guide in the direction of an increasingly larger angle relative to the brake disk, that is, in the direction of reducing the brake reinforcement. As a result, self-boosting of the brake reinforcement, which can cause self-locking or in other words blocking of the disk brake, is avoided. This embodiment of the invention makes good meterability of the disk brake possible and assures the capability in every operating state of reducing the brake reinforcement with only slight positioning energy, if any, in fact down to zero.

Because of its brake reinforcement and high dynamics, the disk brake of the invention is suitable for an electromechanical actuation. A comparatively small electric motor with low power consumption and low weight suffices to actuate the disk brake. The disk brake can be compact and light in weight; its brake caliper including the electromechanical actuating device is only slightly larger than a brake caliper in a hydraulic disk brake. As a result, the disk brake of the invention can be accommodated inside a rim of a vehicle wheel.

BRIEF DESCRIPTION OF THE DRAWINGS

The invention is described in further detail below, with reference to the drawings, in which.

DESCRIPTION OF THE PREFERRED EMBODIMENTS

Figure 1:
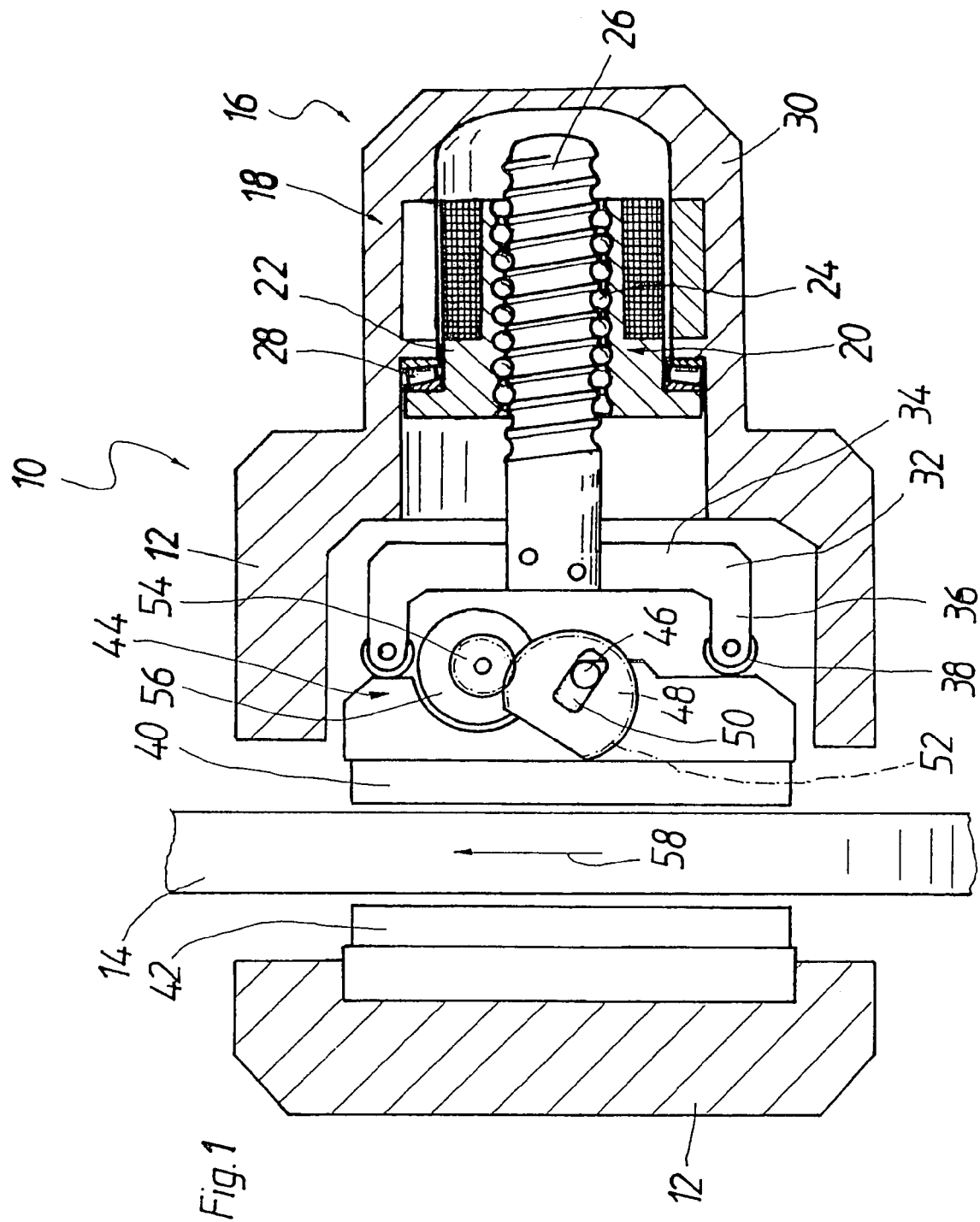
FIG. 1 is a simplified schematic sectional view of a disk brake of the invention, looking radially at a brake disk.

The disk brake 10 of the invention, shown in the drawing, has a brake caliper 12, which is embodied as a floating caliper; that is, it is displaceable transversely to a brake disk 14. The disk brake 10 is actuatable electromechanically; it has an actuating device 16 with an electric motor 18 and a spindle drive 20. The electric motor 18 has a hollow shaft 22 which forms a nut, also marked 22, of the spindle drive 20. The spindle drive 20 is embodied with low friction as a ball-and-screw spindle drive. The nut 22 is in engagement via balls 24 with a spindle 26. Driving the nut 22 to rotate displaces the spindle 26 in the axial direction. The nut 22 of the spindle drive 20, which is at the same time the shaft 22 of the electric motor 18, is braced and rotatably supported via an axial-conical roller bearing 28 in the axial direction in a motor and gear housing 30. The motor and gear housing 30 is a component of the brake caliper 12. It is also possible for the motor and gear housing 30 to be flanged to the brake caliper 12, for instance by screwing it on.

A bridge 32, which has a yoke 34 and two legs 36, is secured to an end of the spindle 26 toward the brake disk 14. The bridge 32 is joined rigidly in the middle of its yoke 34 to the spindle 26. The two legs 36 of the bridge 32 protrude from the yoke 34 in the direction of the brake disk 14. Rollers 38 are supported rotatably on free ends of the legs 36 of the bridge 32, toward the brake disk 14; with these rollers, the bridge 32 rests on a side, remote from the brake disk 14, of a displaceable friction brake lining 40.

The displaceable friction brake lining 40 is disposed between the bridge 32 of the actuating device 16 and the brake disk 14 in the brake caliper 12. For actuating the disk brake 10, the electric motor 18 is supplied with current in a tightening direction, causing the shaft 22 of the electric motor 18 to rotate. As a result of its rotation, the shaft 22, which is at the same time the nut 22 of the spindle drive 20, displaces the spindle 26 in the direction of the brake disk 14. Via the bridge 32, the spindle 26 presses the displaceable friction brake lining 40 against the brake disk 14. As a result of the pressing of the friction brake lining 40 against one side of the brake disk 14, the brake caliper 12, embodied as a floating caliper, is displaced transversely to the brake disk 14 and as a result presses a fixed friction brake lining 42, located immovably in the brake caliper 12 on the opposite side of the brake disk 14, against the other side of the brake disk 14 in a manner known per se. The friction brake linings 40, 42 pressed against the brake disk 14 on both sides exert a braking moment on the brake disk 14; they brake the brake disk 14.

For reducing the braking moment or for completely releasing the disk brake 10, the electric motor 18 is supplied with current in a reverse direction of rotation, so that the friction brake linings 40, 42 are released from the brake disk 14, and the brake disk 14 is freely rotatable.

The friction brake lining 40 that can be pressed by the actuating device 16 against the brake disk 14 is guided displaceably in the brake caliper 12 by a guide 44 for the sake of being pressed against the brake disk 14 and lifted from the brake disk 14. In the exemplary embodiment of the invention shown and described, the guide 44 is embodied as a sliding-block guide 46, 50. The friction brake lining 40 has a sliding block 46 that protrudes radially outward relative to the brake disk 14. The sliding block 46 rests in a groove 50 that is made radially in the adjustment wheel 48. The groove 50 forms a sliding-block path, within which the sliding block 46 and thus the friction brake lining 40 can be displaced. The adjustment wheel 48 is supported rotatably about an imaginary pivot axis in the brake caliper 12. The pivot axis extends parallel, in the exemplary embodiment shown radially, to the brake disk 14. The adjustment wheel 48 has set of teeth 52, in the manner of a gear wheel, on its circumference; the set of teeth 52 is interrupted over a circumferential angle of approximately 90°. Meshing with the set of teeth 52 of the adjustment wheel 48 is a gear wheel 54, which is mounted in a manner fixed against relative rotation on a power takeoff shaft of a second electric motor 56. The electric motor 56 can be embodied for instance as a stepping motor or as a geared motor with a flanged-on (planetary) gear.

A second guide, matching the guide 44 described above, is disposed congruently on a radially inner side, relative to the brake disk 14, of the friction brake lining 40 oriented away from the observer. This second guide is hidden by the friction brake lining 40 and the brake caliper 12 and is therefore not visible in the drawing. It also has an adjustment wheel, which is rotatable about the same pivot axis as the visible adjustment wheel 48. A sliding block that is coaxial with the visible sliding block 46 and that protrudes radially inward from the friction brake lining 40 relative to the brake disk 14 engages a sliding-block path of this hidden adjustment wheel.

The two adjustment wheels 48 are synchronously adjustable together; their sliding-block paths 50 are always congruent, so that the sliding blocks 46 on the radially outer and radially inner sides of the friction brake lining 40 are always guided displaceably in the same direction. For the sake of the joint synchronous adjustment, the two adjustment wheels 48 can be mounted on a common shaft in a manner fixed against relative rotation. In the exemplary embodiment shown, the second electric motor 56 has a gear wheel 54 on both face ends, and these gear wheels mesh with the set of teeth 52 of the adjustment wheels 48. The two gear wheels 54 of the second electric motor 56 are mounted in a manner fixed against relative rotation on a common power takeoff shaft protruding from the electric motor 56 on both sides.

By supplying current to the second electric motor 56, the adjustment wheels 48 on the radially outer and radially inner sides of the friction brake lining 40 can be pivoted, thus adjusting the sliding-block path 50 in its angle to the brake disk 14.

To explain the function of the adjustable guide 44 of the friction brake lining 40, a rotation of the brake disk 14 in the direction of the arrow 58 will be assumed below. For braking, as described earlier above, supplying current to the electric motor 18 causes the actuating device 16 to press the displaceable friction lining 40 against the brake disk 14. The friction brake lining 40 moves in the direction of the sliding-block path 50 then. The adjustment wheel 48 is rotated, as shown in FIG. 1, such that the sliding-block path 50 extends obliquely to the brake disk 14 in the direction of rotation 58 of the brake disk 14. As a result, on being pressed against the brake disk 14, the friction brake lining 40 is displaced obliquely toward the brake disk 14, with a component in the direction of rotation 58 of the brake disk 14. The rotating brake disk 14 exerts a frictional force on the friction brake lining 40 pressed against it, which force is oriented parallel to the brake disk 14, in the circumferential or secant direction and the direction of rotation 58 of the brake disk 14. Because of the sliding-block path 50 positioned obliquely to the brake disk 14, this frictional force brings about a force component in the longitudinal direction of the sliding-block path 50. This force component in the longitudinal direction of the sliding-block path 50 in turn causes an additional pressure force of the friction brake lining 40 against the brake disk 14, which increases the tightening force of the disk brake 10 of the invention. The disk brake 10 has a brake reinforcement or self-boosting; its actuating device 16 produces only some of the tightening force that presses the friction brake lining 40 against the brake disk 14. The remainder of the tightening force of the friction brake lining 40 against the brake disk 14 is brought to bear, as described, by the rotating brake disk 14 as a consequence of the frictional force between the brake disk 14 and the friction brake lining 40, via the guide 44, 50 placed obliquely to the brake disk 14. The proportion of the tightening force not brought to bear by the actuating device 16 is greater, the farther the sliding-block path 50 is adjusted away from an orientation perpendicular to the brake disk 14, into the direction of an increasingly more-acute angle in the direction of rotation 58 of the brake disk 14. By means of this kind of adjustment of the sliding-block path 50, the pressure force of the friction brake lining 40 against the brake disk 14 caused by the frictional force between the brake disk 14 and the friction brake lining 40 increases, thus increasing the brake reinforcement or self-boosting of the disk brake 10 of the invention. Thus the magnitude of the brake reinforcement or self-boosting is adjustable by adjusting the angle of the sliding-block path 50 to the brake disk 14, or in other words by pivoting of the adjustment wheel 48 by the second electric motor 56.

The adjustment wheel 48 of the disk brake 10 of the invention is disposed so close to the brake disk 14 that at maximal pressure force of the friction brake lining 40 against the brake disk 14 and with maximal wear of the friction brake lining 40, the sliding block 46 is not shifted away via the imaginary pivot axis of the adjustment wheel 48 in the direction of the brake disk 14. That is, the sliding block 46 is always located on a side of the pivot axis of the adjustment wheel 48 remote from the brake disk 14; in an extreme case, the sliding block 46 is coaxial with the pivot axis of the adjustment wheel 48. As a result, the frictional force exerted by the brake disk 14 on the friction brake lining 40 acts upon the adjustment wheel 48 via the sliding block 46 with a torque that acts in the direction of an increasingly large angle between the sliding-block path 50 and the brake disk 14. The frictional force exerted by the brake disk 14 on the friction brake lining 40 thus acts on the adjustment wheel 48 in the direction of reducing the brake reinforcement. Self-boosting of the brake reinforcement is avoided, and the adjustment wheel 48 can be restored, without moment, in the direction of a rectangular orientation of the sliding-block path 50 to the brake disk 14, in which orientation the brake reinforcement is zero.

If the direction of rotation of the brake disk 14 is reversed (if the vehicle is driven in reverse), then upon actuation of the disk brake 10, the adjustment wheel 48 is pivoted in the opposite direction from what is shown in the drawing. The brake reinforcement of the disk brake 10 is therefore independent of the direction of rotation.

Figure 2:
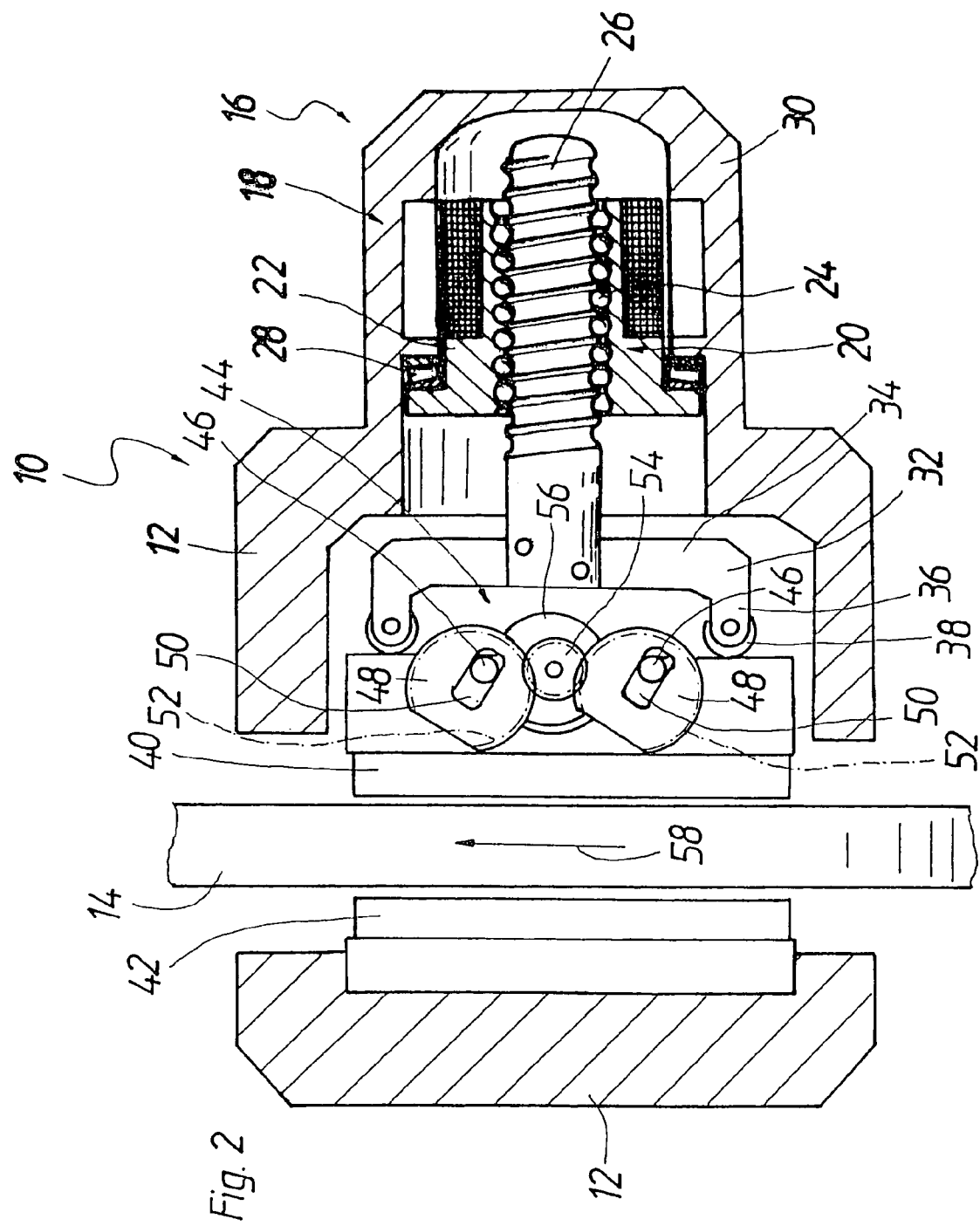
FIG. 2, is a modified embodiment of the disk brake of FIG. 1 according to the invention.

In a distinction from FIG. 1, the disk brake 10 shown in FIG. 2 has two adjustment wheels 48, instead of one adjustment wheel 48, and they are disposed side by side. As shown in FIG. 1, the two adjustment wheels 48 each have a respective sliding-block path 50, in which a sliding block 46 of the friction brake lining 40 rests displaceably. The two adjustment wheels 48 each have a set of teeth 52, which meshes with a gear wheel 54 of the second electric motor 56, so that the two adjustment wheels 48 are pivotable jointly and synchronously with one another.

The sliding-block paths 50 of the two adjustment wheels 48 are in this way always oriented parallel to one another; they form a parallel guide 44, 50 for the friction brake lining 40. As in FIG. 1, in FIG. 2 as well, besides the two visible adjustment wheels 48 on the radially outer side of the friction brake lining 40, there are two further adjustment wheels of the same kind, not visible, disposed congruently on the radially inner side of the friction brake lining 40. The parallel guide 44, 50 of the friction brake lining 40 of the disk brake 10 shown in FIG. 2 prevents tilting of the friction brake lining 40. The adjustment of the guide 44 is done in the same way as in FIG. 1 and brings about a brake reinforcement of the kind that has been described in conjunction with FIG. 1. To avoid repetition, the description of FIG. 1 can be referred to for FIG. 2. The same reference numerals are used in FIG. 2 for components that are the same.

The foregoing relates to preferred exemplary embodiments of the invention, it being understood that other variants and embodiments thereof are possible within the spirit and scope of the invention, the latter being defined by the appended claims.

We claim:

1. A self-boosting disk brake (10) comprising
a brake disk (14),
a friction brake lining (40),
an actuating device (16) with which the friction brake lining can be pressed against the brake disk to generate a self-boosting braking moment, and a guide (44, 50) for the friction brake lining (40),
the angle of the guide relative to the brake disk (14) being adjustable so that the magnitude of the self-boosting of the brake is adjustable, wherein the guide (44, 50) is embodied as a linear guide, and
further comprising a pivotable guide element (48) and a first electric motor (56) for pivoting the guide element (48) independently of the actuating device (16) with which the friction brake lining can be pressed against the brake disk, the guide element (48) including the guide (44, 50) for the friction brake lining (40).

2. A self-boosting disk brake (10) comprising
a brake disk (14),
a friction brake lining (40),
an actuating device with which the friction brake lining can be pressed against the brake disk to generate a braking moment, and a pivotable guide element (48) for the friction brake lining (40),
the angle of the pivotable guide element (48) relative to the brake disk (14) being adjustable and an electric motor (56) for adjusting the angle of the pivotable guide element (48) relative to the brake disk independently of the actuating device, wherein the guide element (48) is embodied such that the friction brake lining (40) pressed against the brake disk (14) urges the the pivotable guide element (48) in the direction of an increasingly larger angle relative to the brake disk (14).

3. A self-boosting disk brake (10) comprising
a brake disk (14),
a friction brake lining (40),
an actuating device with which the friction brake lining can be pressed against the brake disk to generate a braking moment, and a guide (44, 50) for the friction brake lining (40),
the angle of the guide relative to the brake disk (14) being adjustable and an electric motor (56) for adjusting the angle of the guide (44, 50) relative to the brake disk, wherein the guide (44, 50) is embodied as a parallel guide, which guides the friction brake lining (40) displaceably substantially parallel to the brake disk (14), wherein the disk brake (10) comprises two common pivotable guide elements (48) which cooperate to define the guide (44, 50) for the friction brake lining (40), said pivotable guide elements (48) being actuated by said electric motor via a gear wheel (54).

4. A self-boosting disk brake (10) comprising
a brake disk (14),
a friction brake lining (40), an actuating device (16) with which the friction brake lining can be pressed against the brake disk to generate a self-boosting braking moment, and a guide (44, 50) for the friction brake lining (40), the angle of the guide relative to the brake disk (14) being adjustable so that the magnitude of the self-boosting of the brake is adjustable, wherein the guide (44, 50) is embodied as a linear guide, and further comprising a pivotable guide element (48) and a first electric motor (56) for pivoting the guide element (48) independently of the actuating device (16) with which the friction brake lining can be pressed against the brake disk, the guide element (48) including the guide (44, 50) for the friction brake lining (40), wherein the actuating device (16) with which the friction brake lining can be pressed against the brake disk to generate a self-boosting braking moment comprises a second electric motor (18) and a rotation/translation conversion gear (20) for pressing the friction brake lining (40) against the brake disk (14).

* * * * *